US012452167B2

(12) United States Patent
Joshi et al.

(10) Patent No.: US 12,452,167 B2
(45) Date of Patent: Oct. 21, 2025

(54) IDENTIFYING LOOP-ORIGINATION POINTS IN AN OVERLAY NETWORK

(71) Applicant: Hewlett Packard Enterprise Development LP, Spring, TX (US)

(72) Inventors: Vinayak Joshi, Bangalore (IN); Venkatavaradhan Devarajan, Bangalore (IN); Balaji Sankaran, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 2 days.

(21) Appl. No.: 18/480,361

(22) Filed: Oct. 3, 2023

(65) Prior Publication Data
US 2025/0112855 A1    Apr. 3, 2025

(51) Int. Cl.
*H04L 45/28*      (2022.01)
*H04L 45/42*      (2022.01)
*H04L 45/745*    (2022.01)

(52) U.S. Cl.
CPC .............. *H04L 45/28* (2013.01); *H04L 45/42* (2013.01); *H04L 45/745* (2013.01)

(58) Field of Classification Search
CPC .... H04W 40/00; H04L 12/422; H04L 12/437; H04L 41/12; H04L 41/0661; H04L 41/0681; H04L 43/50; H04L 45/18; H04L 12/42; H04L 12/423; H04L 41/22; H04L 43/0841; H04L 69/324
See application file for complete search history.

(56) References Cited

U.S. PATENT DOCUMENTS

| | | | | |
|---|---|---|---|---|
| 7,706,270 B2* | 4/2010 | Nomura | ............... | H04L 69/324 |
| | | | | 370/233 |
| 2006/0285487 A1* | 12/2006 | Yasuie | ............... | H04L 41/0681 |
| | | | | 370/216 |
| 2007/0177661 A1* | 8/2007 | VanZante | ............... | H04L 41/12 |
| | | | | 375/213 |
| 2007/0230357 A1* | 10/2007 | Lin | ......................... | H04L 43/50 |
| | | | | 370/241.1 |
| 2009/0219821 A1* | 9/2009 | Kamachi | ............... | H04L 12/437 |
| | | | | 370/242 |
| 2010/0290385 A1* | 11/2010 | Ankaiah | ............... | H04W 40/00 |
| | | | | 370/315 |
| 2013/0003601 A1* | 1/2013 | Gupta | ..................... | H04L 45/18 |
| | | | | 370/254 |

(Continued)

*Primary Examiner* — Dustin Nguyen
(74) *Attorney, Agent, or Firm* — Yao Legal Services, Inc.

(57) ABSTRACT

A network management system (NMS) for provisioning and managing an overlay network is provided. During operation, the NMS can determine that a loop associated with a media access control (MAC) address is detected in the network. The NMS can probe a first switch in the loop by instructing the first switch to observe the MAC address for a predetermined period. The NMS can receive a first message indicating a first set of ports of the first switch observing the MAC address. The NMS can probe an upstream switch reachable via each of the first set of ports by instructing the upstream switch to observe the MAC address for the predetermined period. Here, observing the MAC address at an upstream port of the upstream switch causes further upstream probing. Based on probing the switches in the loop, the NMS can determine one or more loop origination points (LOPs) for the loop.

20 Claims, 11 Drawing Sheets

(56) References Cited

U.S. PATENT DOCUMENTS

| | | | |
|---|---|---|---|
| 2015/0124643 A1* | 5/2015 | Pani | H04L 41/12 |
| | | | 370/254 |
| 2018/0026872 A1* | 1/2018 | Manthiramoorthy | ........................ |
| | | | H04L 12/437 |
| | | | 370/249 |
| 2018/0102944 A1* | 4/2018 | Mishra | H04L 12/422 |
| 2019/0288871 A1* | 9/2019 | Xie | H04L 41/0661 |
| 2021/0051100 A1* | 2/2021 | Chitalia | H04L 41/22 |
| 2021/0160173 A1* | 5/2021 | Biradar | H04L 43/0841 |
| 2021/0306252 A1* | 9/2021 | Jain | H04L 45/18 |
| 2024/0022451 A1* | 1/2024 | Dikshit | H04L 12/42 |
| 2024/0146574 A1* | 5/2024 | Murray | H04L 12/423 |
| 2025/0126049 A1* | 4/2025 | Jain | H04L 45/18 |

* cited by examiner

IDENTIFYING LOOP-ORIGINATION POINTS IN AN OVERLAY NETWORK

BACKGROUND

A switch in a network may support different protocols and services. For example, the switch can support an overlay network formed based on tunneling and virtual private networks (VPNs). The switch can then facilitate overlay routing for a VPN over the tunnels.

BRIEF DESCRIPTION OF THE FIGURES

In the figures, like reference numerals refer to the same figure elements.

DETAILED DESCRIPTION

Figure 1:
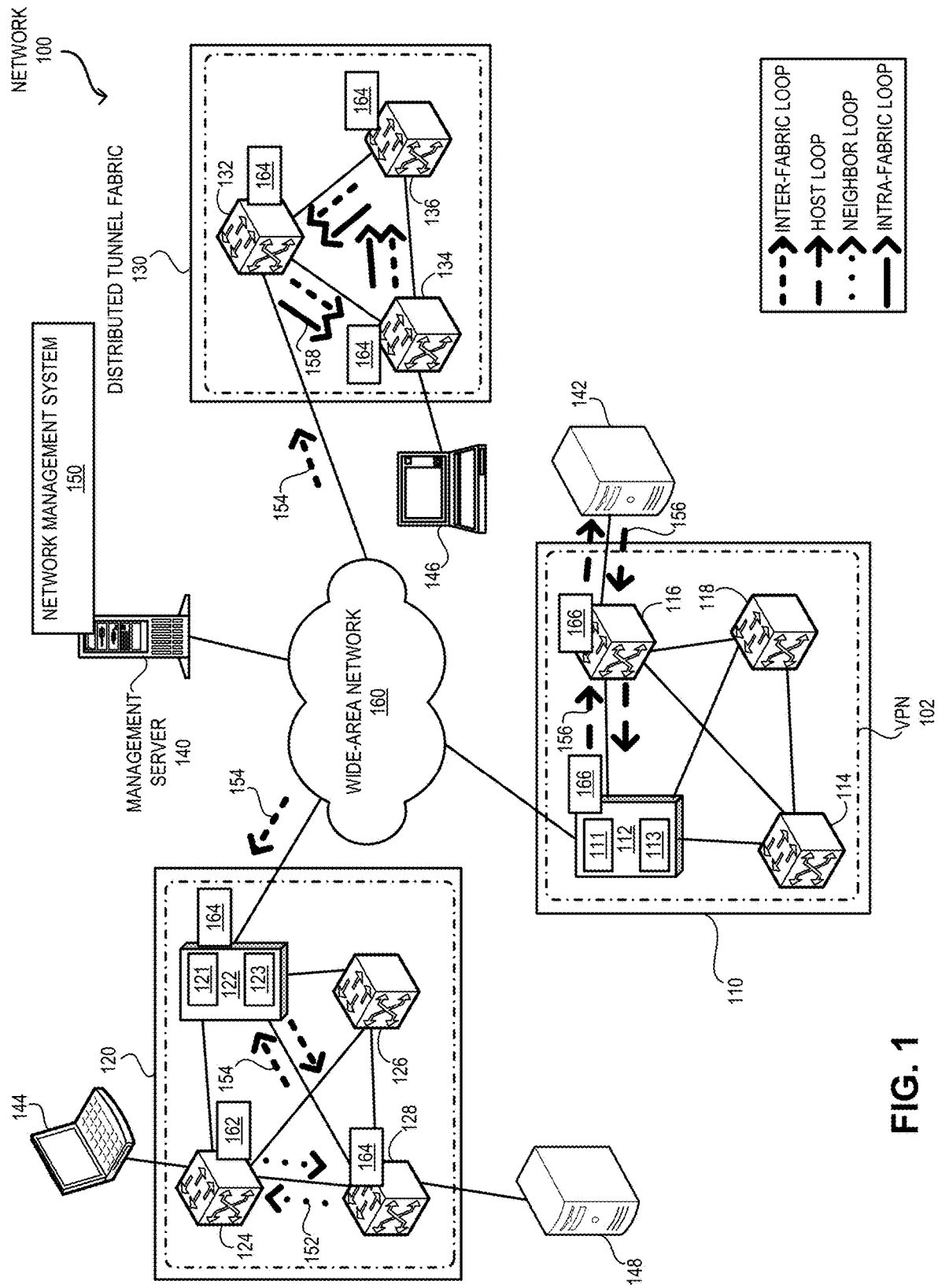
FIG. 1 illustrates examples of loop-origination point (LOP) detection in an overlay network, in accordance with an aspect of the present application.

In various Internet applications, multicast is frequently used to distribute content such as video from a source to multiple hosts. Efficient distribution of multicast traffic can improve the performance of a network. A network-layer multicast protocol, such as protocol-independent multicast (PIM), can be used for distributing content in a heterogeneous network. In some scenarios, a host can send a client join request (e.g., an Internet Group Management Protocol (IGMP) join request or a Multicast Listener Discovery (MLD) join request) to an upstream switch. The switch can be in an overlay network formed based on overlay routing for a VPN over a set of tunnels. For example, an Ethernet VPN (EVPN) can be deployed as an overlay over a set of virtual extensible local area networks (VXLANs).

To deploy a VPN over the tunnels, a respective tunnel endpoint may map a respective client virtual local area network (VLAN) to a corresponding tunnel network identifier (TNI), which can identify a virtual network for a tunnel. The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if layer-3 routing and forwarding are needed. Since a VPN can be distributed across the tunnel fabric, a VPN over the tunnel fabric can also be referred to as a distributed tunnel fabric. Since the fabric is an overlay network, a respective switch in the fabric can be a tunnel endpoint of one or more tunnels. The fabric can include a gateway switch that can facilitate external communication for the fabric. As a result, any other switch of the fabric can communicate with a switch outside of the fabric via the gateway switch, thereby facilitating communication between networks. The gateway switch of the fabric can be a virtual gateway switch (VGS), which can be a virtualized switch running a plurality of participating switches of the fabric.

Typically, a network management system (NMS), such as a network orchestrator, can configure a respective switch to operate the switch as a tunnel endpoint in a fabric. Similarly, the NMS can configure a respective participating switch of a VGS. The NMS can be a cloud-based system operating on a server or a controller (e.g., a network controller or a software-defined network (SDN) controller). The NMS can facilitate the visibility of the network (e.g., the switches and links of the network) to an administrator. The administrator can use the NMS (e.g., using a dashboard or console) to configure the operating parameters based on which the switches in a network may operate. Examples of the operating parameters can include, but are not limited to, VLAN, VXLAN, routing, and forwarding parameters. In other words, the NMS can control the management plane of the network.

The aspects described herein address the problem of efficiently identifying a switch causing a loop associated with a MAC address in an overlay network by (i) recursively probing switches on a loop path to determine the ports observing the MAC address; and (ii) identifying the probed switches that have incorrectly forwarded a packet with the MAC address as a destination address. When a switch in the network detects a loop (e.g., using any loop-detection mechanism), the loop-detecting switch can notify the NMS of the network. The NMS can then probe a respective upstream switch of the detecting switch to determine the ports that have observed the MAC address. Among the probed switches along the loop path, the NMS can determine which one or more switches have caused the loop. Here, the loop path indicates the path traversed by the looped packet (i.e., the path of the loop).

An overlay network, such as a distributed tunnel fabric, can be coupled to other networks via a gateway switch. The gateway switch can be a VGS in the overlay network. Typically, at least two switches can operate as a single switch in conjunction with each other to facilitate the VGS. Switches participating in the VGS can be referred to as participating switches. A respective participating switch can consider the other participating switches as peer participating switches (or peer switches). A respective pair of participating switches can be coupled to each other via an inter-switch link (ISL). The VGS can be associated with one or more virtual network addresses (e.g., a virtual Internet Protocol (IP) address and/or a virtual media access control (MAC) address). A respective tunnel formed at the VGS can use the virtual network address to form the tunnel endpoint. As a result, other tunnel endpoints (i.e., other switches) of the overlay network can consider the VGS as the other tunnel endpoint for a tunnel instead of any of the participating switches.

To forward traffic toward the VGS, a respective switch in the overlay network can perform a load balancing operation (e.g., based on hashing on a respective packet) and select one of the participating switches as the destination (i.e., as the other tunnel endpoint). The switch can use a routing protocol, such as Border Gateway Protocol (BGP), to determine the routes used for the load balancing. The switch can then forward the packet via a tunnel between the tunnel endpoints. Hence, an endpoint may forward a multicast control packet to one of the participating switches, which in turn, can share the control packet with a peer participating switch via the ISL. Similarly, if the switch receives a multicast data packet via a tunnel, the switch can share the packet with the peer participating switch via the ISL.

In the overlay network, a switch can detect the presence of a loop using a loop-detection mechanism. For example, because a switch learns the source MAC address from a port (e.g., based on the Ethernet MAC address learning process), the switch can observe the source MAC addresses of packets. If the switch forwards packets with a source MAC address via a port and observes packets with the source MAC address at another port at a high rate within a short period, the switch can determine that a loop is formed across the ports. The switch detecting a loop can be referred to as a detecting switch. A respective port can be a local port and a tunnel port (e.g., a port configured with a tunnel interface). The detecting switch can then report the loop to the NMS, such as a network orchestrator. The reporting can include the MAC address and the ports at which the MAC address is observed.

Subsequently, the NMS or the switch can perform a corrective action to prevent (or "break") the loop. Such corrective action can include disabling the port from which the MAC address has been observed. Even though a corrective action (e.g., disabling a port) to prevent the loop can be performed, the NMS may not be able to identify the device and an associated configuration error causing the loop. In particular, in an overlay network, a loop detected in one fabric can be caused by another fabric or an end device coupling the fabric. As a result, the error causing the loop may continue to exist in the network even after the corrective action is performed.

To solve this problem, when the switch reports a loop associated with a MAC address, the NMS can determine the port of the switch that has detected the loop. This port can be referred to as a detecting port. The NMS can then recursively probe the switches that have observed the MAC address (e.g., received a packet with the MAC address as a source address). To perform the recursive probing, the NMS can add the upstream switch reachable via the detecting port to a list of probed switches. For example, if the switch observes the MAC address from a port configured with a tunnel, the NMS can add the other tunnel endpoint to the list. The NMS can then instruct that switch to monitor the local ports for the MAC address for a predetermined period. Upon completion of the monitoring, the switch can report the result of the monitoring to the NMS. Based on the report, the NMS can determine the port(s) of the switch at which the MAC address is observed.

The NMS can then identify the further upstream switch (es) reachable via respective determined port(s) and add the identified switch(es) to the list. The NMS may add a switch to the list if the switch is not already present in the list. The NMS can continue to probe the switch(es) on the list. Here, the probing of a switch can include instructing the switch to monitor the MAC address and analyzing the resultant monitoring data to determine the ports observing the MAC address. This process of probing the switches to determine the ports that observe the MAC address can then recursively continue further upstream. Because the probing can recursively continue upstream via the ports that have observed the MAC address, the probing is performed along the reverse direction on the loop path. Furthermore, since the looped packet traverses the loop path via the ports observing the MAC address, these ports can be referred to as loop-path ports.

The NMS can terminate the recursive probing of the switches if there are no other upstream switches associated with the MAC address on the loop path. In other words, the recursive exploration can terminate when all switches in the list are probed. If a switch in the list loops the packets back by violating a forwarding rule (e.g., the split-horizon rule or the full-mesh principle), the NMS can mark the switch as a loop origination point (LOP) and add the switch to a list of LOPs for the loop. The combination of the split-horizon rule and the full-mesh principle prevents a switch from forwarding a packet received from a tunnel of a fabric within the same fabric. Furthermore, if a switch receives a packet from a local port that does not couple the end device with the MAC address, the switch can also be considered an LOP on behalf of the end device. In this way, the NMS can identify the LOPs causing a loop associated with the MAC address in the network.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates examples of LOP detection in an overlay network, in accordance with an aspect of the present application. An overlay network 100 can include a number of switches and devices, and may include heterogeneous network components, such as layer-2 and layer-3 hops and tunnels. In some examples, network 100 can be an Ethernet, InfiniBand, or other network, and may use a corresponding communication protocol, such as Internet Protocol (IP), FibreChannel over Ethernet (FCOE), or other protocol. Network 100 can include a plurality of distributed tunnel fabrics 110, 120, and 130. Hence, network 100 can be a multi-fabric network. Fabric 110 can include switches 111, 113, 114, 116, and 118; fabric 120 can include switches 121, 123, 124, 126, and 128; and fabric 130 can include switches 132, 134, and 136. A respective switch in a respective fabric can be associated with a MAC address and an IP address. In a respective fabric of network 100, switches can be coupled to each other via a tunnel.

In FIG. 1, a respective link denoted with a solid line between a switch pair can indicate a tunnel. Switches of a respective fabric in network 100 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in a fabric can be formed over an underlying network (or an underlay network). The underlying network can be a physical network, and a respective link of the underlying network can be a physical link. A respective switch pair in the underlying network can be a Border Gateway Protocol (BGP) peer. A VPN 102, such as an Ethernet VPN (EVPN), can be deployed over fabric 110. Similarly, respective VPN instances can be deployed over fabrics 120 and 130. Fabric 110 can include a VGS 112 coupled to a VGS 122 of fabric 120 via a wide-area network (WAN) 160, such as an enterprise network or the Internet. VGS 112 and VGS 122 can be coupled to gateway switch 132 of fabric 130 via network 160. Since VGS 112 and VGS 122 are virtual switches, they can also be referred to as switches.

In fabric 110, switches 111 and 113 can operate as a single switch in conjunction with each other to facilitate VGS 112. Similarly, switches 121 and 123 can operate as a single switch in conjunction with each other to facilitate VGS 122 in fabric 120. VGS 112 can be associated with one or more virtual addresses (e.g., a virtual IP address and/or a virtual MAC address). A respective tunnel formed at VGS 112 can use the virtual address to form the tunnel endpoint. To efficiently manage data forwarding, switches 111 and 113 can maintain an ISL between them for sharing control and/or data packets. The ISL can be a layer-2 or layer-3 connection that allows data forwarding between switches 111 and 113. The ISL can also be based on a tunnel between switches 111 and 113 (e.g., a VXLAN tunnel).

Because the virtual address of VGS 102 is associated with both switches 113 and 113, other tunnel endpoints, such as switches 114, 116, and 118, of fabric 110 can consider VGS 112 as the other tunnel endpoint for a tunnel instead of switches 111 and 113. To forward traffic toward VGS 112 in fabric 110, a remote switch, such as switch 114, 116, or 118, can operate as a tunnel endpoint while VGS 112 can be the other tunnel endpoint. From a respective remote switch of fabric 110, there can be a set of paths (e.g., equal-cost multiple paths or ECMP) to VGS 112. For example, the ECMP can include a path to switch 111 and another path to switch 113. Hence, a respective path in the underlying network can lead to one of the participating switches of VGS 112. In the same way, VGS 122 can be associated with one or more virtual addresses. Other tunnel endpoints of fabric 120 can consider VGS 122 as the other tunnel endpoint for a tunnel instead of switches 121 and 123. From a respective remote switch of fabric 120, there can be a set of ECMP to VGS 122.

One or more switches of a respective fabric in network 100 can be coupled to one or more end devices. The switches coupling end devices can be access switches. The access switches of a respective fabric in network 100 can form an access layer in that fabric. End devices 142, 144, 146, and 148 can be coupled to switches 116, 124, 134, and 128, respectively. An NMS 150, which can be a network orchestrator, can configure a respective switch in network 100. NMS 150 can be a cloud-based system operating on a management server 140. NMS 150 can operate on a network controller or an SDN controller. NMS 150 can control the management plane of the network. To do so, an administrator can use NMS 150 (e.g., using a dashboard or console) to configure the operating parameters based on which the switches in network 100 may operate. Examples of the operating parameters can include, but are not limited to, VLAN, VXLAN, routing, and forwarding parameters.

Network 100 can deploy one or more forwarding rules, such as the split-horizon rule and the full-mesh principle, to avoid loops. For example, the split-horizon rule indicates that a switch should not forward packets (e.g., multi-destination packets, such as broadcast, unknown unicast, and multicast packets) back to the direction of arrival. For example, if switch 128 receives a multicast packet from end device 148, switch 128 can forward the packet to switches 122, 124, and 126 via corresponding tunnels. Because the packet is received via tunnels in fabric 120, the split-horizon rule indicates that switches 122, 124, and 126 should not forward the packet back to switch 128. Furthermore, because switch 128 is responsible for distributing the packet to each other switch in fabric 120, the full-mesh principle indicates that switches 122, 124, and 126 should not forward the packet within fabric 120.

If the forwarding rules are misconfigured at a switch in network 100, the switch may forward a packet back to another switch that has already forwarded the packet. Consequently, a loop can occur in network 100 with the switch as the LOP. During operation, switch 124 can receive a packet with a source MAC address 162 from end device 144 via an access port. End device 148 can be a recipient of the packet. End device 148 can be a recipient of the packet if the packet is a unicast packet and the destination address corresponds to end device 148. On the other hand, if the packet is a multicast packet, end device 148 can be a recipient if it is a requesting host. Furthermore, if the packet is a broadcast or unknown unicast packet, end device 148 can be a recipient if end devices 144 and 148 are in the same VLAN.

Accordingly, switch 124 can forward the packet to switch 128. Due to a misconfiguration associated with the forwarding rules, switch 128 can forward the packet back to switch 124, thereby creating a neighbor loop 152, which can be a loop between neighbor switches in fabric 120. Switch 124 can then detect the presence of loop 152 using a loop-detection mechanism. For example, switch 124 can learn MAC address 162 from the ingress port of the packet and hence, can observe MAC addresses 162. Since switch 124 has received the packet via the access port, switch 124 has previously learned the MAC address from the access port. Therefore, switch 124 can determine that the packet is looped back to switch 124.

Similarly, when switch 128 receives a packet with a source MAC address 164. End device 146 can be a recipient of the packet. Switch 128 can forward the packet to fabric 120 via VGS 122. Because VGS 122 can receive the packet via an intra-fabric packet, VGS 122 can forward the packet to switch 132 via an inter-fabric tunnel spanning network 160. Switch 132 can then forward the packet to switch 134. Due to a misconfiguration associated with the forwarding rules, switch 132 can forward the packet back to a neighbor switch 136. Similarly, due to a misconfiguration, switch 134 can forward the packet to switch 132. As a result, an intra-fabric loop 158 occurs in fabric 130 because the packet is looped back to switch 132.

Because switch 132 can receive the packet via an intra-fabric packet, switch 132 can forward the packet to VGS 122 via an inter-fabric tunnel spanning network 160. Upon receiving the packet, VGS 122 can forward the packet to switch 128. This can also cause a multi-fabric loop 154 in network 100. Loop 154 can span fabrics 120 and 130 over network 160. Switches 128 and 132 can use the loop-detection mechanism on MAC address 164 to detect loops 154 and 158, respectively. In addition, an end device can also be misconfigured. For example, switch 116 can receive a packet with a source MAC address 166 from VGS 112. If end device 142 is a recipient of the packet, switch 116 can forward the packet to end device 142. Due to a misconfiguration, end device 142 can send the packet back to switch 116, which can forward the packet to VGS 112, thereby causing a host loop 156. VGS 112 can use the loop-detection mechanism on MAC address 166 to detect loop 156.

Switches 124, 128, 112, and 132 can then report loops 152, 154, 156, and 158 to NMS 150. The reporting for loop 152 can include MAC address 162 and the ports at which MAC address 162 is observed. Similarly, the reporting for loops 154 and 158 can include MAC address 164 and the ports at which MAC address 164 is observed. NMS 150 or the respective detecting switches can perform a corrective action to prevent (or "break") loops 152, 154, 156, and 158. For loop 152, the corrective action can include disabling the port from which MAC address 162 has been re-observed at switch 124. However, disabling the port may also disable the tunnel interface on the port. Consequently, the tunnel between switches 124 and 128 can become inactive.

Furthermore, NMS 150 may not be able to identify that a configuration error on switch 128 caused loop 152. This can become more challenging if a loop, such as multi-fabric loop 154, is detected in fabric 120 but is caused in fabric 130. As a result, the error causing loop 154 may continue to exist in network 100 even after a corrective action is performed. Moreover, end device 142 can be a client device outside of the control of NMS 150. As a result, NMS may not be able to prevent loop 156. In this way, the corrective actions may not be directed to the LOPs associated with a loop.

To solve this problem, when switch 132 reports loop 158 associated with MAC address 164, NMS 150 can determine the port of switch 132 that has detected loop 158. NMS 150 can then recursively probe the switches that have observed MAC address 164. Observing MAC address 164 can include receiving a number of packets with MAC address 164 as a source address within a short period. To perform the recursive probing, NMS 150 can add upstream switch 136 from which the packets have been received to a list of probed switches. Since switch 132 observes MAC address 164 from a port configured with a tunnel, NMS 150 can add the other tunnel endpoint, switch 136, to the list. NMS 150 can probe switch 136, which can include instructing switch 136 to monitor the local ports for MAC address 136 for a predetermined period. Upon completion of the monitoring, switch 136 can report the result of the monitoring to NMS 150.

Based on the report, NMS 150 can determine the loop-path ports of switch 136 at which MAC address 164 is observed.

NMS 150 can then identify a further upstream switch 134 reachable via the loop-path port. Since switch 134 is not already on the list, NMS 150 can add switch 134 to the list. NMS 150 can then continue to probe switch 134 from the list. Since the further upstream switch is switch 132, which has detected loop 158 and is already on the list, the recursive probing can terminate at switch 136. NMS 150 can determine that switches 134 and 136 have forwarded packets violating forwarding rules.

Consequently, NMS 150 can identify switches 134 and 136 as LOPs of loop 158. Similarly, by probing the primary switch of VGS 112 and switch 116 associated with loop 156, NMS 150 can determine that end device 142 is causing loop 156. Since end device 142 is outside of fabric 110, NMS 150 may determine switch 116 as the LOP. In this way, NMS 150 can identify the LOPs causing the loops in network 100.

Figure 2:
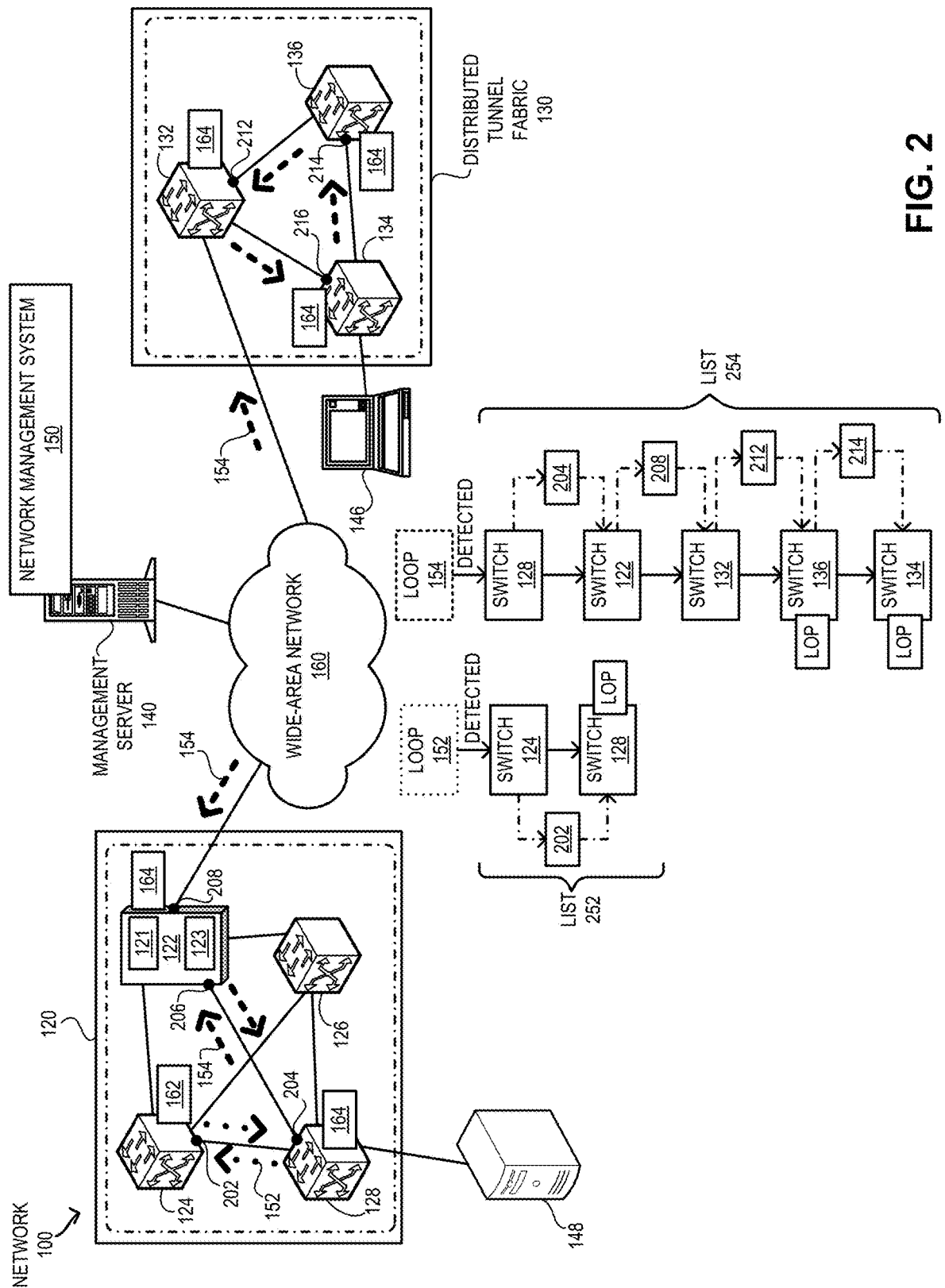
FIG. 2 illustrates an example of a network management system (NMS) recursively probing switches in a loop path, in accordance with an aspect of the present application.

FIG. 2 illustrates an example of an NMS recursively probing switches in a loop path, in accordance with an aspect of the present application. During operation, switch 124 can detect loop 152 when a number of packets with MAC address 162 as a source address is observed at port 202 within a predetermined period. Switch 124 can then report loop 152 to NMS 150. The report can include port 202 and a network address of switch 124 (e.g., an IP and/or MAC address). Switch 124 can generate a notification message destined for NMS 150 and include the report in the notification message. When NMS 150 receives the message, NMS 150 can obtain the report and add switch 124 to list 252 of the probed switches associated with loop 152. NMS 150 can identify that the upstream switch reachable via port 202 is switch 128. NMS 150 can then add switch 128 to list 252.

Since switch 124 detects loop 252 on port 202, NMS 150 can determine that port 202 is on the loop path. NMS 150 can then determine that switch 128 is next in list 252 and probe switch 128. Based on the probing, NMS 150 can receive a report from switch 128 indicating the observation of MAC address 162. NMS 150 can determine that the next upstream switch is switch 124, which is already in list 252. NMS 150 can then terminate the recursive probing for loop 152. NMS 150 can determine, based on the reports obtained from the probing, that switch 128 has forwarded a packet received via fabric 120 back to fabric 120, thereby violating a forwarding rule. Accordingly, NMS 150 can identify switch 128 as the LOP for loop 152. NMS 150 may add switch 128 to a list of LOPs associated with loop 152.

Similarly, switch 128 can detect loop 154 associated with MAC address 164 via port 204. When switch 128 notifies NMS 150 regarding loop 154, NMS 150 can add switch 128 to list 254 of the probed switches associated with loop 154. Here, port 204 of switch 128 and port 206 of VGS 122 can be configured with respective tunnel interfaces. A tunnel between the tunnel interfaces can couple switch 128 to VGS 122. NMS 150 can then identify that the upstream switch reachable via port 204 is VGS 122. NMS 150 can then add VGS 122 to list 254. Since VGS 122 is a virtual switch operating on switches 111 and 113, NMS 150 can probe the switch that physically houses port 206. Alternatively, NMS may probe both switches 111 and 113 to observe MAC address 164. If the loop is associated with a multicast packet of a multicast group, NMS 150 can probe the primary switch for the multicast group. The primary switch can be responsible for forwarding packets of the multicast group on behalf of VGS 112.

NMS 150 can continue to recursively probe switches based on the ports that have observed MAC address 164. Since VGS 122 can receive packets with source MAC address 164 via port 208, NMS 150 can identify upstream switch 132 reachable via port 208 and add switch 132 to list 254. The same VLAN can be configured on ports 204, 206, and 208. Subsequently, NMS 150 can probe switch 132, identify loop-path port 212 of switch 132, and add upstream switch 136 reachable via port 212 to list 254. Similarly, NMS 150 can probe switch 136, identify loop-path port 214 of switch 136, and add upstream switch 134 reachable via port 214 to list 254. However, when NMS 150 probes switch 134, NMS 150 can identify loop-path port 216 of switch 134 and determine that switch 132 is already on list 254. NMS 150 can then terminate the recursive probing process. By probing the switches on list 254, NMS 150 can identify which switch has violated or breached a forwarding rule and mark the identified switches as LOPs for loop 154.

For example, NMS 150 can determine that switch 132 has correctly forwarded to switch 134 since recipient end device 146 is coupled to switch 134. However, NMS 150 can determine that switch 134 has forwarded packets received via fabric 130 to switch 136. Similarly, NMS 150 can determine that switch 136 has forwarded packets received via fabric 130 to switch 132. For both instances, the forwarding has breached both the split-horizon rule and the mesh principle. Therefore, NMS 150 can identify switches 134 and 136 as LOPs for loop 154. It should be noted that switches 134 and 136 can be LOPs for loops 154 and 158, as described in conjunction with FIG. 1. Hence, a loop can include one or more LOPs, and an LOP can contribute to multiple loops.

Figure 3:
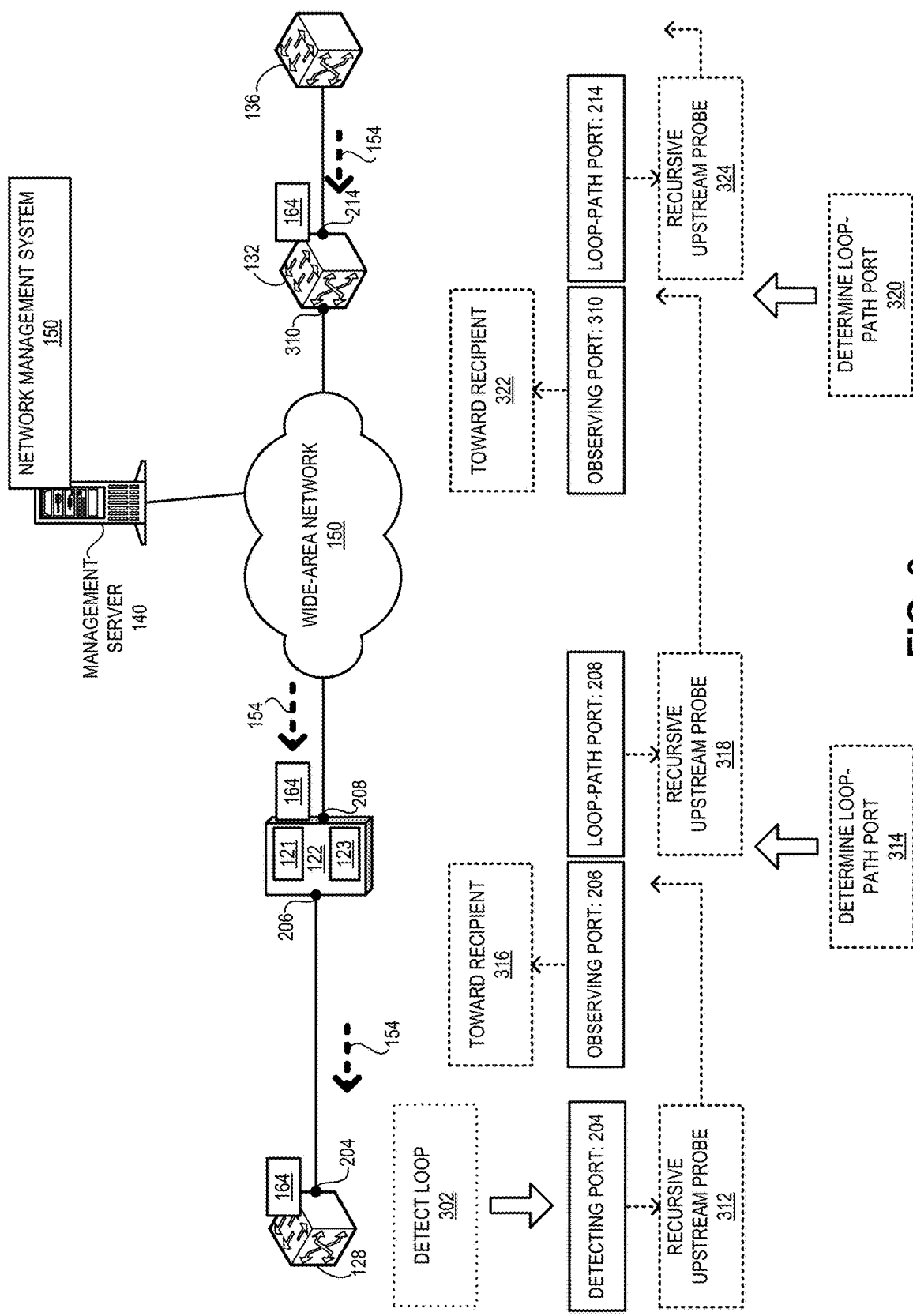
FIG. 3 illustrates an example of an NMS identifying loop-path ports of a probed switch in a loop path, in accordance with an aspect of the present application.

To recursively probe the switches on the loop path of loop 154, NMS 150 can determine whether a port observing MAC address 164 is a loop-path port. FIG. 3 illustrates an example of an NMS identifying loop-path ports of a probed switch in a loop path, in accordance with an aspect of the present application. During operation, switch 128 can detect loop 154 via port 204 of switch 128 (operation 302). NMS 150 can then determine port 204 as the detecting port of loop 154 and recursively probe the upstream switch, VGS 122, reachable via port 204 (operation 312). Based on the probing, VGS 122 can monitor MAC address 164 for a predetermined period. The monitoring can be performed by a respective physical switch being probed by NMS 150.

Based on the data obtained from the probing, NMS 150 can determine the loop-path port associated with loop 154 (operation 314). If a port observes MAC address 164 and the port is not associated with a recipient of MAC address 164, the port may have received packets via a loop path. Such a port, therefore, can be referred to as a loop-path port. The other ports can be referred to as observing ports. VGS 122 can observe MAC address 164 at ports 206 and 208. These ports can be on the same or different switches. Furthermore, the same VLAN can be configured on both ports 206 and 208. NMS 150 can determine that port 206 is toward a valid recipient, such as end device 146 coupled to a remote fabric 130 (operation 316). Therefore, NMS 150 can determine port 208 as a loop-path port and port 206 as an observing port. Hence, NMS 150 can recursively probe upstream switch 132 reachable via port 208 (operation 318).

Switch 132 can observe MAC address 164 at ports 310 and 214. Among ports 310 and 214, NMS 150 can determine the loop-path port associated with loop 154 (operation 320). NMS 150 can determine that port 310 is toward a valid recipient and hence, is an observing port (operation 322). Therefore, NMS 150 can determine port 214 as a loop-path port. Subsequently, NMS 150 can recursively probe upstream switch 136 reachable via port 214 (operation 324). In this way, NMS 150 can determine the ports observing MAC address 164 as the loop-path ports. NMS 150 can then perform the recursive probing based on the loop-path ports and not on the observing ports.

Figure 4A:
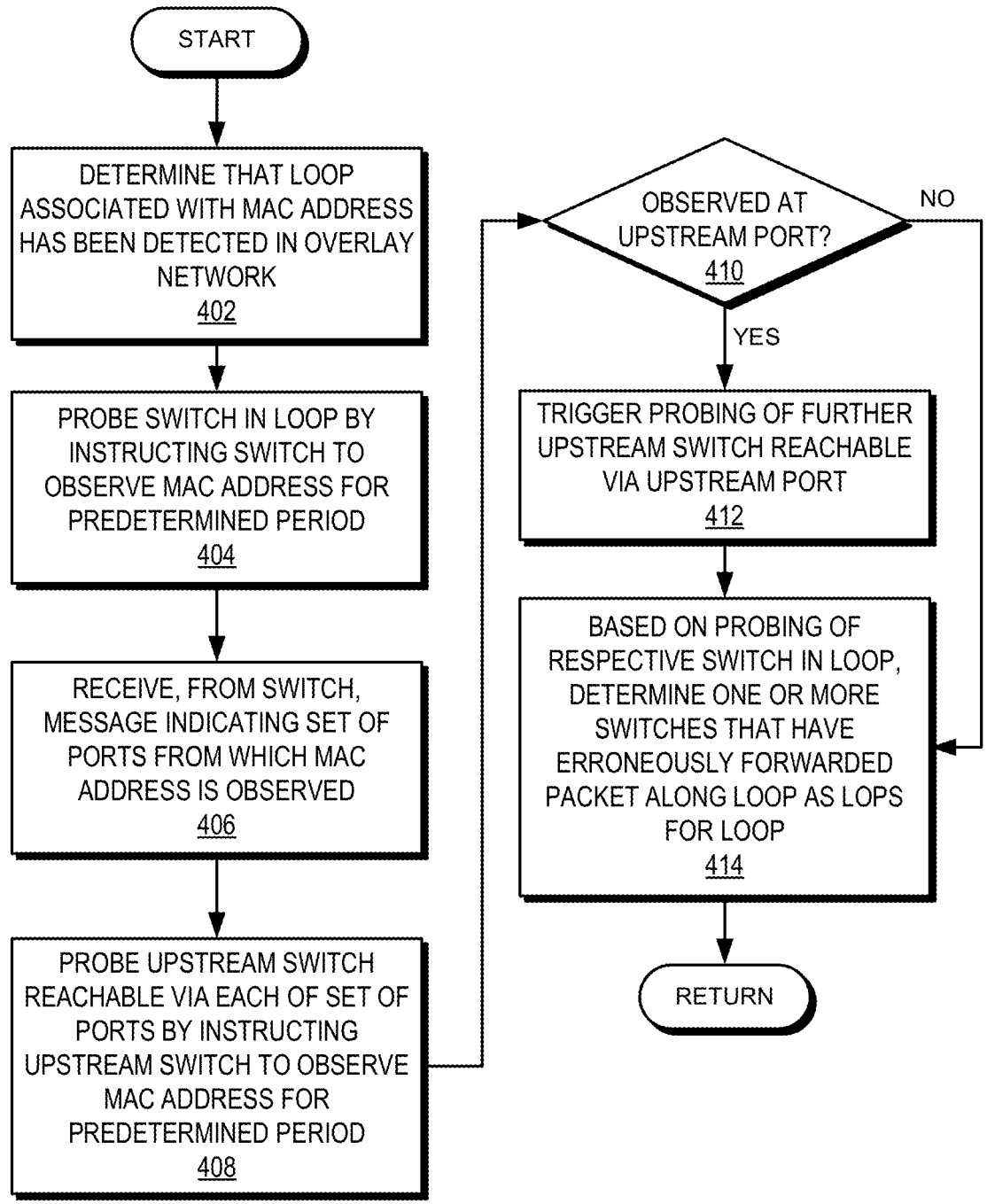
FIG. 4A presents a flowchart illustrating the process of an NMS determining LOPs of a loop, in accordance with an aspect of the present application.

FIG. 4A presents a flowchart illustrating the process of an NMS determining LOPs of a loop, in accordance with an aspect of the present application. During operation, the NMS can determine that a loop associated with a MAC address in an overlay network has been detected (operation 402). The NMS can then probe a switch in the loop by instructing the switch to observe the MAC address for a predetermined period (operation 404). The NMS can receive, from the switch, a message indicating a set of ports of the switch from which the MAC address is observed (operation 406). Here, observing the MAC address at a port can include receiving a plurality of packets with the MAC address via the port.

Subsequently, the NMS can probe an upstream switch reachable via each of the set of ports by instructing the upstream switch to observe the MAC address for the predetermined period (operation 408). The NMS can determine whether the MAC address is observed at an upstream port of the upstream switch (operation 410). If the MAC address is observed at an upstream port, the NMS can trigger probing of a further upstream switch reachable via the upstream port (operation 412). Based on the probing of a respective switch in the loop, the NMS can determine one or more switches that have erroneously forwarded a packet along the loop as LOPs for the loop (operation 414).

Figure 4B:
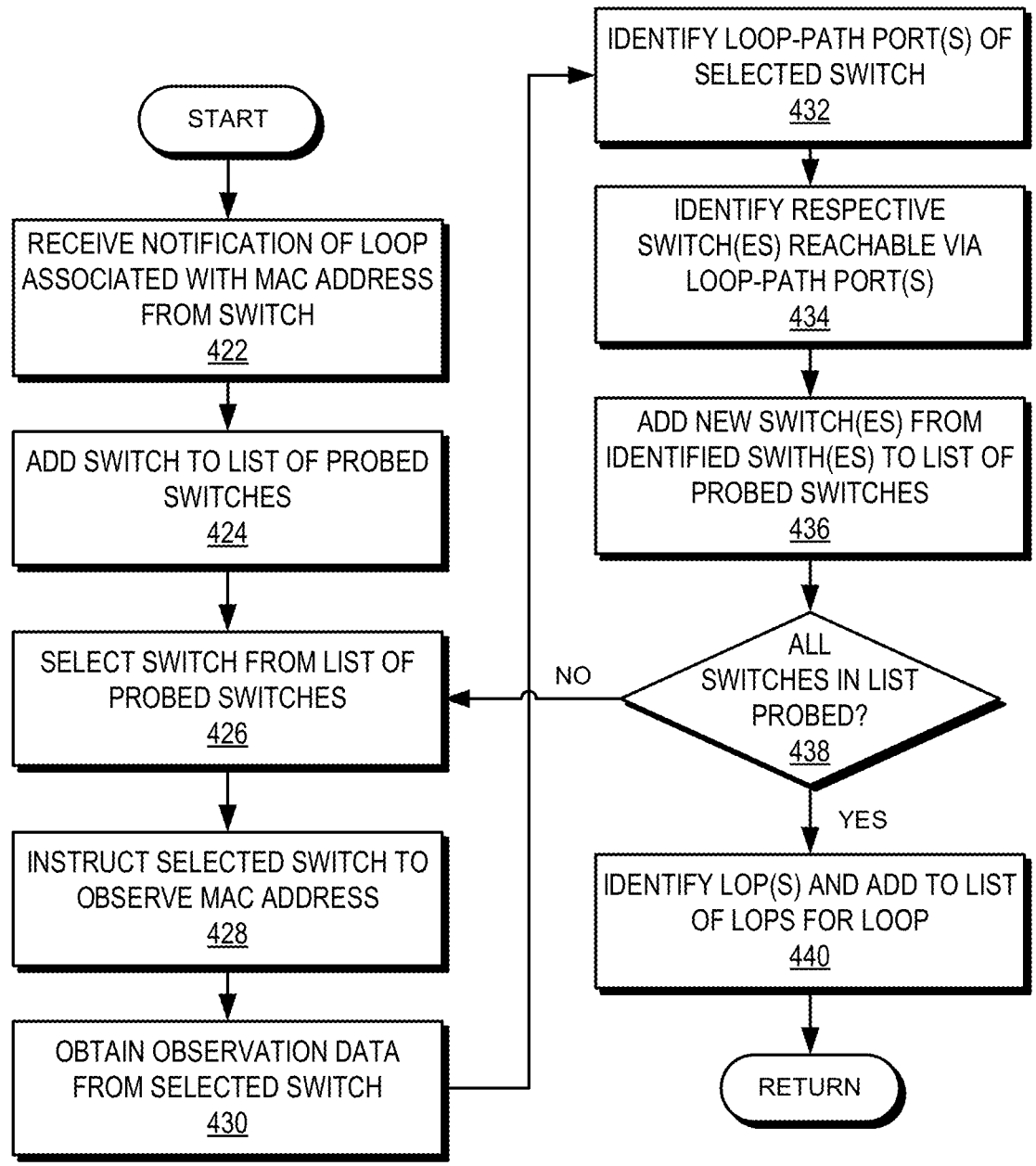
FIG. 4B presents a flowchart illustrating the process of an NMS recursively probing switches in a loop path, in accordance with an aspect of the present application.

FIG. 4B presents a flowchart illustrating the process of an NMS recursively probing switches in a loop path, in accordance with an aspect of the present application. During operation, the NMS can receive a notification of a loop associated with a MAC address from a switch (operation 422) and add the switch to a list of probed switches (operation 424). The NMS can then select a switch from the list of probed switches (operation 426) and instruct the selected switch to observe the MAC address (operation 428). Subsequently, the NMS can obtain the observation data (e.g., based on reporting from the switch) (operation 430).

The NMS can then identify the loop-path port(s) of the selected switch (operation 432) and identify respective switch(es) reachable via the loop-path port(s) (operation 434). The NMS can add the new switch(es) (i.e., not already in the list) from the identified switch(es) to the list of probed switches (operation 436). The NMS can determine whether all switches in the list are probed (operation 438). If all switches in the list are not probed, the NMS can continue to select another switch from the list of probed switches (operation 426). On the other hand, if all switches in the list are probed, the NMS can identify LOP(s) and add them to the list of LOPs for the loop (operation 440).

Figure 4C:
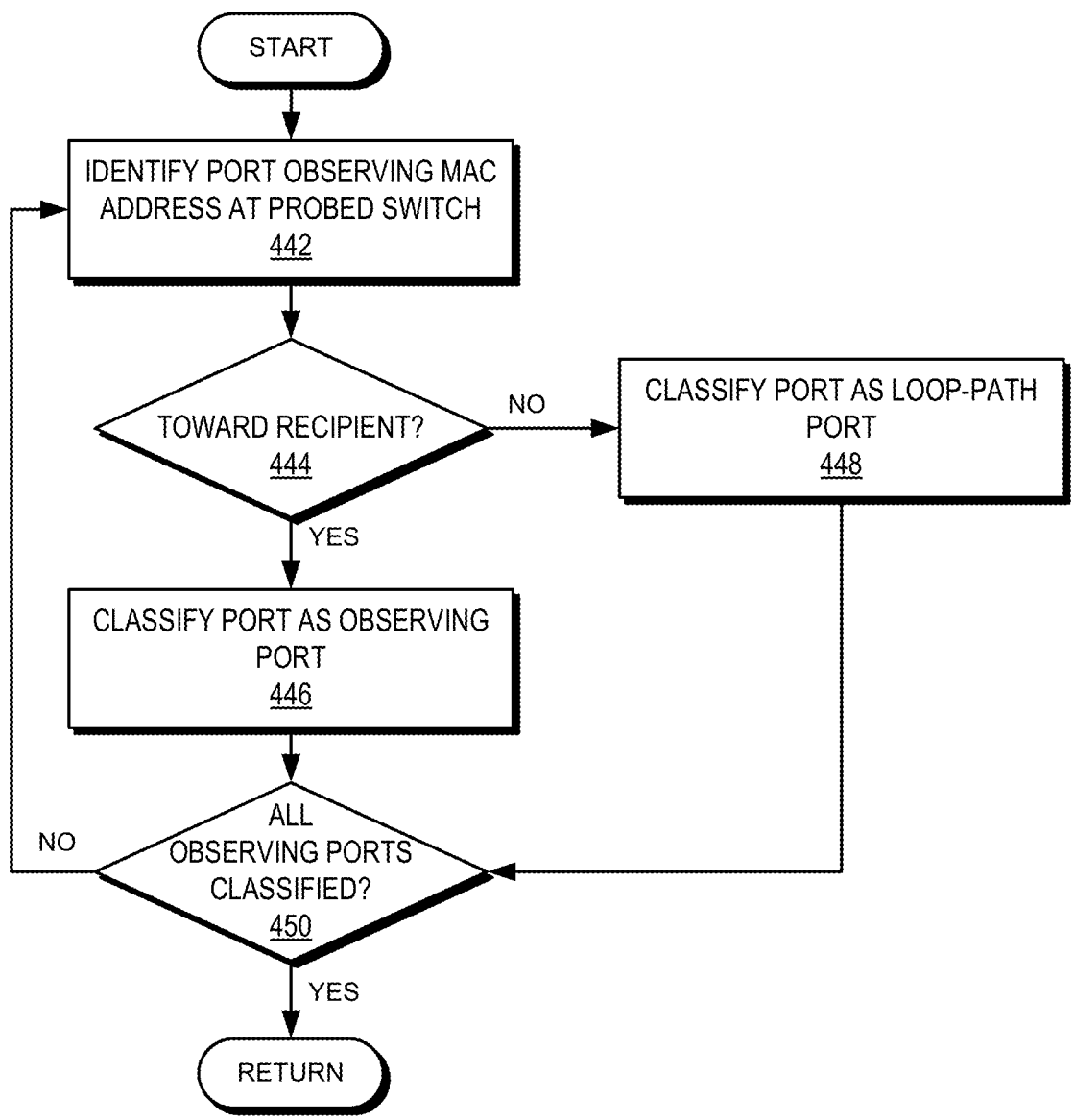
FIG. 4C presents a flowchart illustrating the process of an NMS identifying loop-path ports of a probed switch, in accordance with an aspect of the present application.

FIG. 4C presents a flowchart illustrating the process of an NMS identifying loop-path ports of a probed switch, in accordance with an aspect of the present application. During operation, the NMS can identify a port observing a MAC address at the probed switch (operation 442) and determine whether the port is toward a recipient (operation 444). If the port is toward a recipient, the NMS can classify the port as an observing port (operation 446). On the other hand, if the port is not toward a recipient, the NMS can classify the port as a loop-path port (operation 448). Upon classifying the port (operation 446 or 448), the NMS can determine whether all observing ports at the probed switch are classified (operation 450). If all observing ports are not classified, the NMS can continue to identify another port observing a MAC address at the probed switch (operation 442).

Figure 4D:
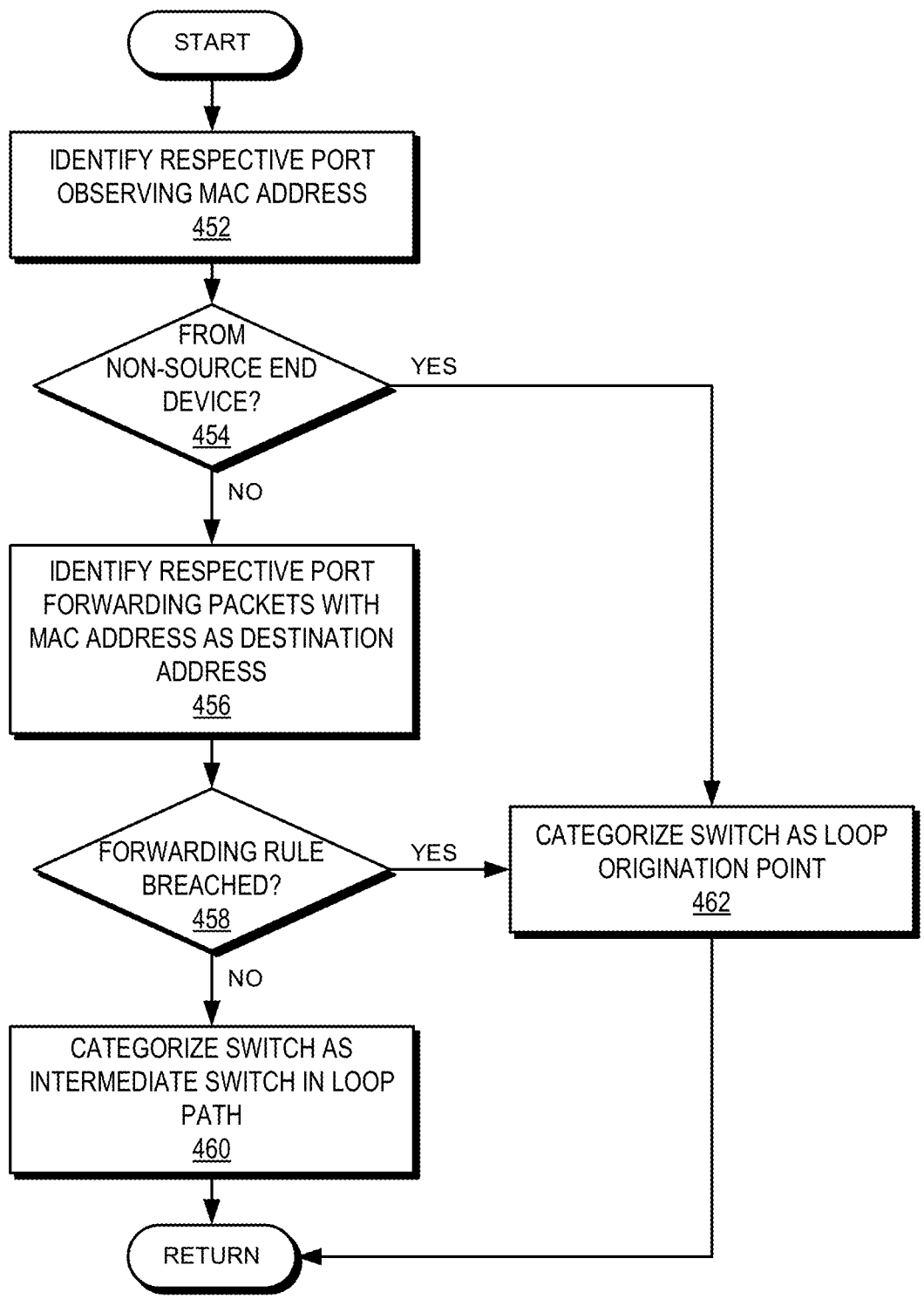
FIG. 4D presents a flowchart illustrating the process of an NMS determining whether a probed switch is an LOP, in accordance with an aspect of the present application.

FIG. 4D presents a flowchart illustrating the process of an NMS determining whether a probed switch is an LOP, in accordance with an aspect of the present application. During operation, the NMS can identify a respective port observing the MAC address (operation 452) and determine whether the MAC address is observed in a packet from a non-source end device (operation 454). If the MAC address is not observed in a packet from a non-source end device, the NMS can identify a respective port forwarding packets with the MAC address as the destination address (operation 456).

The NMS can then determine whether a forwarding rule is breached for the forwarding (operation 458). If the MAC address is observed in a packet from a non-source end device (operation 454) or a forwarding rule is breached for the forwarding (operation 458), the NMS can categorize the switch as an LOP (operation 462). On the other hand, if a forwarding rule is not breached for the forwarding (operation 458), the NMS can categorize the switch as an intermediate switch on the loop path (operation 460).

Figure 5:
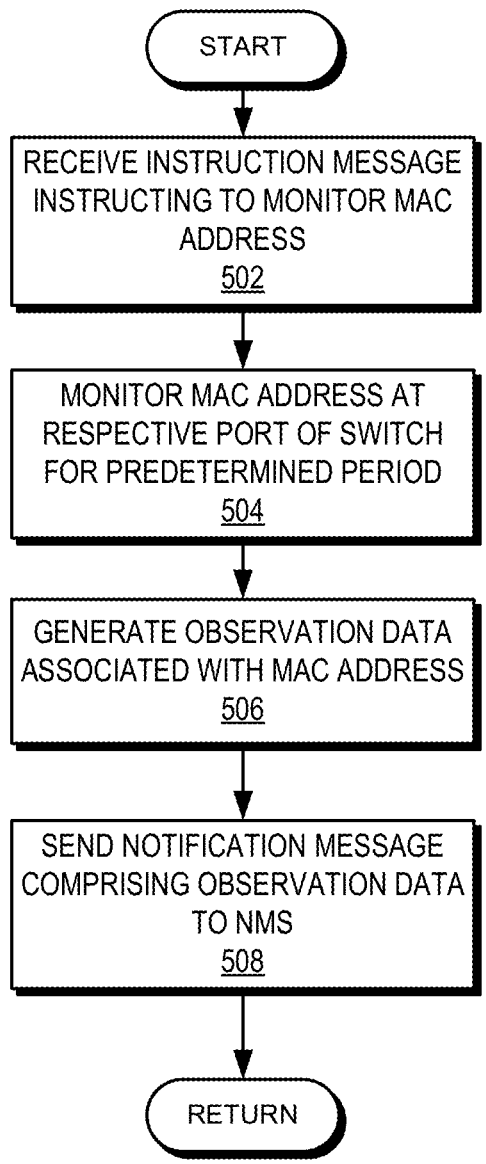
FIG. 5 presents a flowchart illustrating the process of a switch observing a media access control (MAC) address at local ports, in accordance with an aspect of the present application.

FIG. 5 presents a flowchart illustrating the process of a switch observing a MAC address at local ports, in accordance with an aspect of the present application. During operation, the switch can receive an instruction message instructing the switch to monitor the MAC address (operation 502). The switch can then monitor the MAC address at a respective port of the switch for a predetermined period (operation 504) and generate observation data associated with the MAC address (operation 506). The observation data can include the number of observed packets and timestamps associated with individual observation. The switch can then send a notification message comprising the observation data to the NMS (operation 508).

Figure 6:
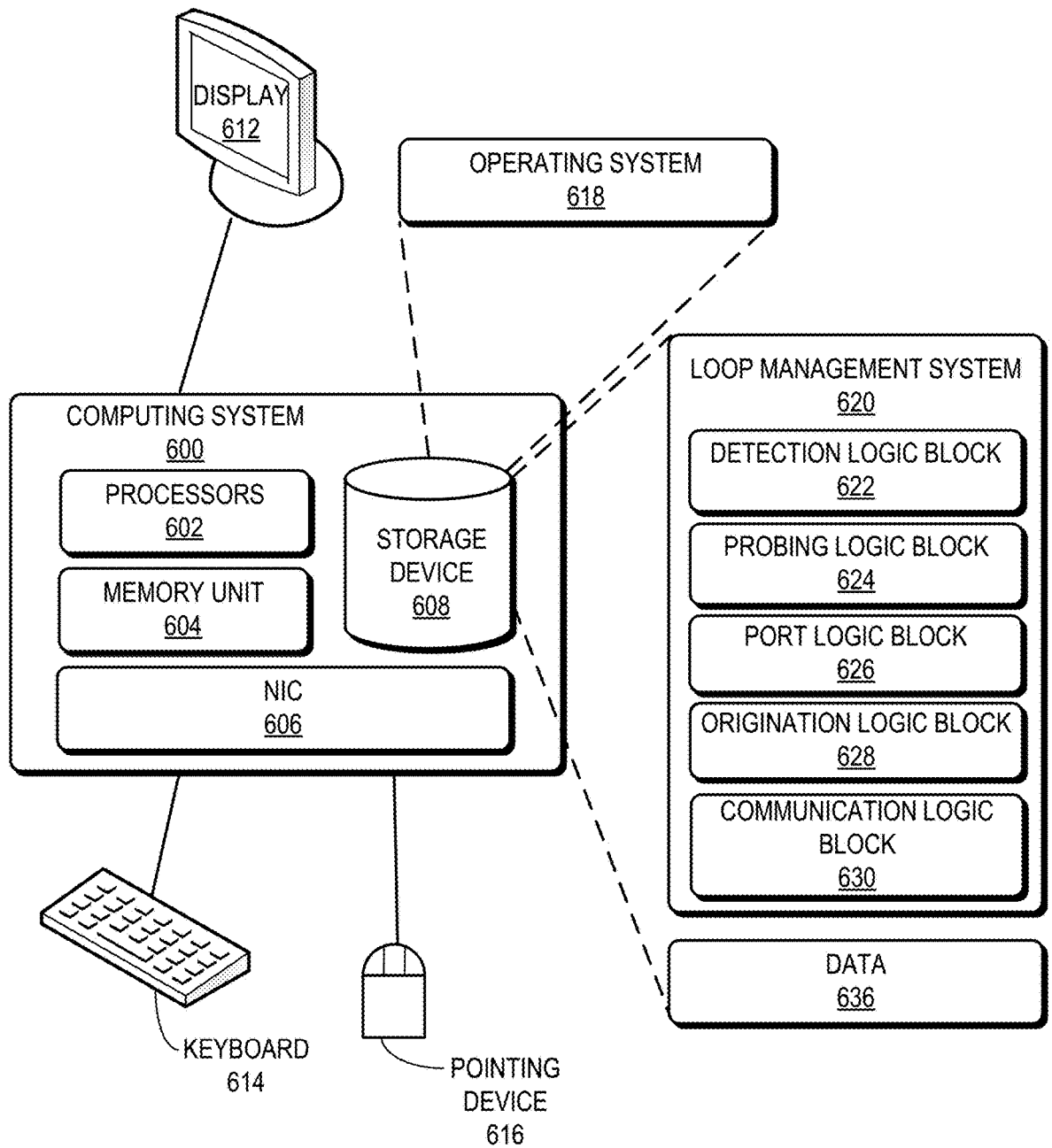
FIG. 6 illustrates an example of a computing system facilitating LOP detection in an overlay network, in accordance with an aspect of the present application.

FIG. 6 illustrates an example of a computing system facilitating LOP detection in an overlay network, in accordance with an aspect of the present application. A computing system 600 can include a set of processors 602, a memory unit 604, a network interface card (NIC) 606, and a storage device 608. Memory unit 604 can include a set of volatile memory devices (e.g., dual in-line memory module (DIMM)). Furthermore, computing system 600 may be coupled to a display device 612, a keyboard 614, and a pointing device 616, if needed. Storage device 608 can store an operating system 618, a loop management system 620, and data 636.

Loop management system 620 can include instructions, which when executed by computing system 600, can cause computing system 600 to perform methods and/or processes described in this disclosure. Loop management system 620 can be deployed with an NMS running on computing system 600. Specifically, loop management system 620 can include instructions for determining that a loop has been detected in a network (detection logic block 622). Loop management system 620 can include instructions for recursively probing switches on a loop path associated with the loop (probing logic block 624). Loop management system 620 can also include instructions for identifying loop-path ports of a loop (port logic block 626). Loop management system 620 can include instructions for determining the LOP(s) of the loop (origination logic block 628). Loop management system 620 may include further instructions for sending and receiving packets (communication logic block 630). Data 636 can include any data that can facilitate the operations of loop management system 620. Data 636 can include, but is not limited to, observation data from one or more switches, a list of probed switches, and a list of LOPs for individual loops.

Figure 7:
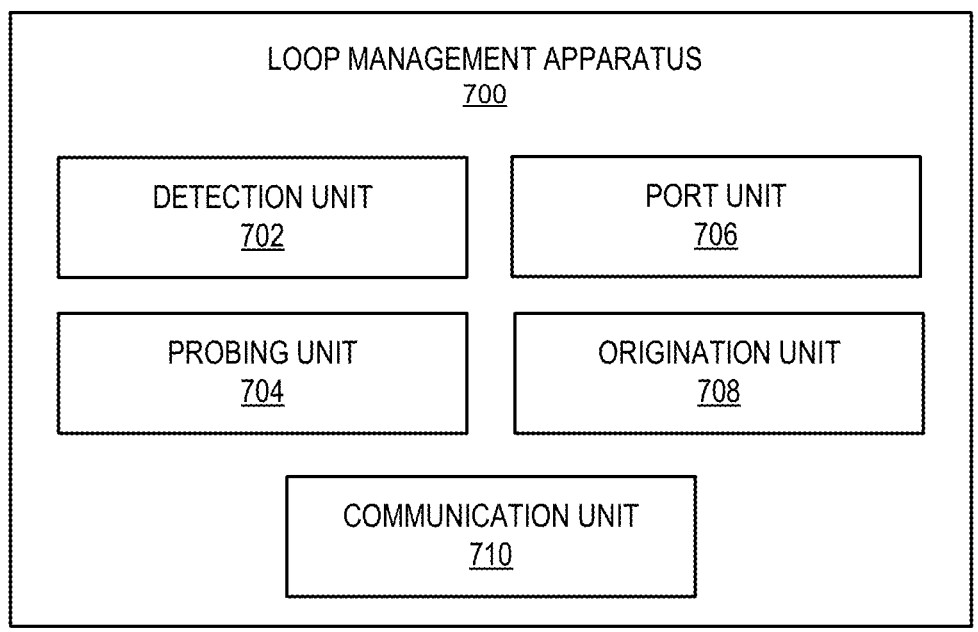
FIG. 7 illustrates an example of an apparatus that facilitates LOP detection in an overlay network, in accordance with an aspect of the present application.

FIG. 7 illustrates an example of an apparatus that facilitates LOP detection in an overlay network, in accordance with an aspect of the present application. Loop management apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated with a computer system, or realized as a specialized device. For example, apparatus 700 can be an accelerator in a computer system. Specifically, apparatus 700 can comprise units 702-710, which perform functions or operations similar to logic blocks 622-630 of loop management system 620 of FIG. 6, including: a detection unit 702, a probing unit 704; a port unit 706, an origination unit 708; and a communication unit 710.

Figure 8:
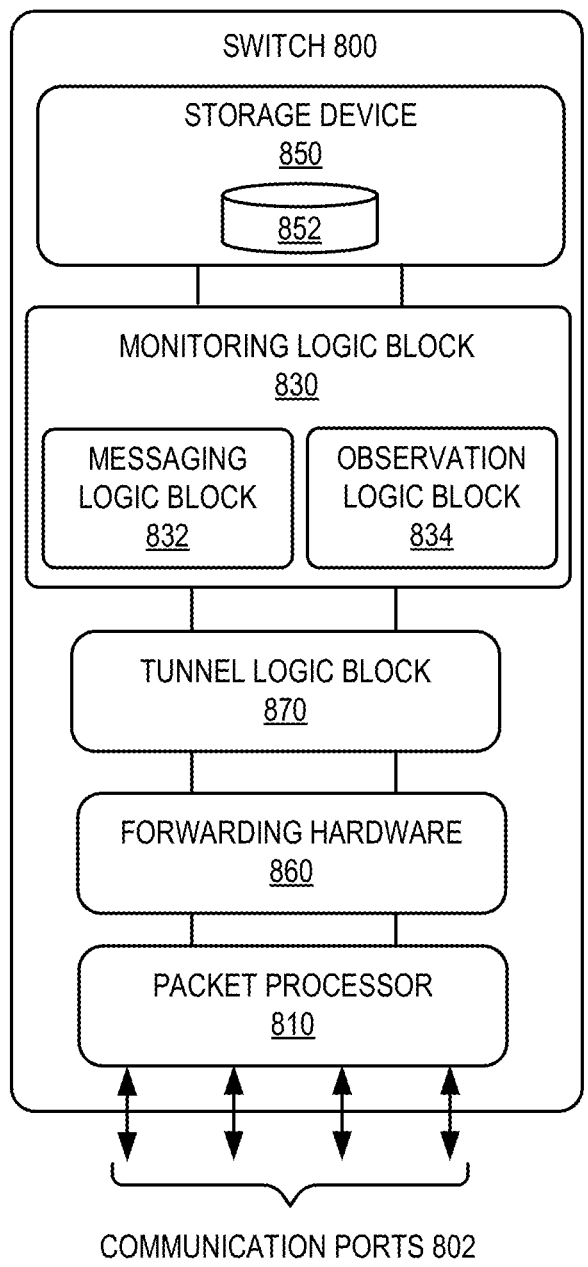
FIG. 8 illustrates an example of a switch supporting MAC address observation for facilitating LOP detection in an overlay network, in accordance with an embodiment of the present application.

FIG. 8 illustrates an example of a switch supporting MAC address observation for facilitating LOP detection in an overlay network, in accordance with an embodiment of the present application. A switch 800 can include a number of communication ports 802, a packet processor 810, and a storage device 850. Switch 800 can also include forwarding hardware 860 (e.g., processing hardware of switch 800, such as its application-specific integrated circuit (ASIC) chips), which includes information based on which switch 800 processes packets (e.g., determines output ports for packets). Packet processor 810 extracts and processes header information from the received packets. Packet processor 810 can identify a switch identifier (e.g., a MAC address and/or an IP address) associated with switch 800 in the header of a packet.

Communication ports 802 can include inter-switch communication channels for communication with other switches and/or user devices. The communication channels can be implemented via a regular communication port and based on any open or proprietary format. Communication ports 802 can include one or more Ethernet ports capable of receiving frames encapsulated in an Ethernet header. Communication ports 802 can also include one or more IP ports capable of receiving IP packets. An IP port is capable of receiving an IP packet and can be configured with an IP address. Packet processor 810 can process Ethernet frames and/or IP packets. A respective port of communication ports 802 may operate as an ingress port and/or an egress port. If switch 800 is in a fabric, switch 800 can include a tunnel logic block 870 that can operate switch 800 as a tunnel endpoint (e.g., by initiating and terminating tunnel encapsulation) in the fabric.

Switch 800 can maintain a database 852 (e.g., in storage device 850). Database 852 can be a relational database and may run on one or more database management system (DBMS) instances. Database 852 can store information associated with routing and configuration associated with switch 800. Switch 800 can include a monitoring logic block 830 that facilitates monitoring communication ports 602 for observing the MAC address. Flow trimming logic block 830 can include a messaging logic block 832 and an observation logic block 834.

Messaging logic block 832 can determine, from a message from an NMS, an instruction instructing switch 800 to monitor communication ports 602 for a predetermined time. Observation logic block 834 can determine whether the MAC address is observed at one or more of communication ports 602 based on the monitoring. Observation logic block 834 can also generate observation data based on the monitoring. Messaging logic block 832 can then generate a message comprising the observation data for the NMS.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide an NMS that can provision and manage a respective switch of an overlay network. During operation, the NMS can determine that a loop associated with a media access control (MAC) address has been detected in the overlay network. The NMS can then probe a first switch in the loop by instructing the first switch to observe the MAC address for a predetermined period. The NMS can receive, from the first switch, a first message indicating a first set of ports of the first switch from which the MAC address is observed. Observing the MAC address at a port can include receiving a plurality of packets with the MAC address via the port. Subsequently, the NMS can probe an upstream switch reachable via each of the first set of ports by instructing the upstream switch to observe the MAC address for the predetermined period. Here, observing the MAC address at an upstream port of the upstream switch causes probing of a further upstream switch reachable via the upstream port. Based on the probing of a respective switch in the loop, the NMS can determine one or more switches that have erroneously forwarded a packet along the loop as loop origination points (LOPs) for the loop.

In a variation on this aspect, the NMS can receive a notification message from a detecting switch in the loop indicating the detection of the loop. The loop can be detected by the detecting switch by observing packets with the MAC address from multiple sources at a high rate within the predetermined period.

In a further variation, a respective source can correspond to a local port of the detecting switch or a tunnel of the overlay network.

In a further variation, a respective source can be associated with the same virtual local area network (VLAN).

In a variation on this aspect, the NMS can determine whether a packet is erroneously forwarded by determining whether a forwarding rule of the overlay network has been breached for the packet.

In a further variation, the forwarding rule can prevent the forwarding of a packet back to a fabric in the overlay network that sent the packet. The fabric can be formed based on a set of tunnels initiated and terminated within the fabric.

In a variation on this aspect, the NMS can receive, from the upstream switch, a second message indicating a second set of ports of the upstream switch from which the MAC address is observed.

In a variation on this aspect, upon determining that a switch has observed the MAC address, the NMS can add the switch to a list of probed switches and probe a respective switch of the list of probed switches.

In a variation on this aspect, the NMS can terminate the probing of the respective switch of the list of probed switches upon determining that there is no further upstream switch associated with the MAC address present in the overlay network.

In a variation on this aspect, the NMS can determine that the first set of ports of the first switch are not directed to a recipient.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
    determining, by a network management system (NMS), that a loop associated with a media access control (MAC) address has been detected in an overlay network, wherein a respective network device in the overlay network is provisioned and managed by the NMS;
    probing, by the NMS, a first network device in the loop by instructing the first network device to observe the MAC address for a predetermined period;
    receiving, from the first network device by the NMS, a first message indicating a first set of ports of the first network device from which the MAC address is observed, wherein observing the MAC address at a port includes receiving a plurality of packets with the MAC address via the port;
    probing, by the NMS, an upstream network device reachable via each of the first set of ports by instructing the upstream network device to observe the MAC address for the predetermined period, wherein observing the MAC address at an upstream port of the upstream network device causes probing of a further upstream network device reachable via the upstream port; and
    determining, by the NMS based on probing of a respective network device in the loop, one or more network devices that have erroneously forwarded a packet along the loop as loop origination points (LOPs) for the loop.

2. The method of claim 1, further comprising receiving, by the NMS, a notification message from a detecting network device in the loop indicating detection of the loop, wherein the loop is detected by the detecting network device by observing packets with the MAC address from multiple sources at a high rate within the predetermined period.

3. The method of claim 2, wherein a respective source corresponds to a local port of the detecting network device or a tunnel of the overlay network.

4. The method of claim 2, wherein a respective source is associated with a same virtual local area network (VLAN).

5. The method of claim 1, wherein determining whether a packet is erroneously forwarded further comprises determining whether a forwarding rule of the overlay network has is for the packet.

6. The method of claim 5, wherein the forwarding rule prevents forwarding of a packet back to the overlay network that sent the packet.

7. The method of claim 1, further comprising receiving, from the upstream network device by the NMS, a second message indicating a second set of ports of the upstream network device from which the MAC address is observed.

8. The method of claim 1, further comprising:
in response to determining that a network device has observed the MAC address, adding the network device to a list of probed network devices; and
probing a respective network device of the list of probed network devices.

9. The method of claim 8, further comprising terminating the probing of the respective network device of the list of probed network devices in response to determining that there is no further upstream network device associated with the MAC address present in the overlay network.

10. The method of claim 1, further comprising determining that the first set of ports of the first network device is not directed to a recipient.

11. A non-transitory computer-readable storage medium storing instructions that when executed by a processor of a computer running a network management system (NMS) of an overlay network cause the computer to perform a method, the method comprising:
determining that a loop associated with a media access control (MAC) address has been detected in an overlay network, wherein a respective network device in the overlay network is provisioned and managed by the NMS;
probing a first network device in the loop by instructing the first network device to observe the MAC address for a predetermined period;
receiving, from the first network device, a first message indicating a first set of ports of the first network device from which the MAC address is observed, wherein observing the MAC address at a port includes receiving a plurality of packets with the MAC address via the port;
probing an upstream network device reachable via each of the first set of ports by instructing the upstream network device to observe the MAC address for the predetermined period, wherein observing the MAC address at an upstream port of the upstream network device causes probing of a further upstream network device reachable via the upstream port; and
determining, based on probing of a respective network device in the loop, one or more network devices that have erroneously forwarded a packet along the loop as loop origination points (LOPs) for the loop.

12. The non-transitory computer-readable storage medium of claim 11, wherein the method further comprises receiving a notification message from a detecting network device in the loop indicating detection of the loop, wherein the loop is detected by the detecting network device by observing packets with the MAC address from multiple sources at a high rate within the predetermined period.

13. The non-transitory computer-readable storage medium of claim 12, wherein a respective source corresponds to a local port of the detecting network device or a tunnel of the overlay network.

14. The non-transitory computer-readable storage medium of claim 11, wherein determining whether a packet is erroneously forwarded further comprises determining whether a forwarding rule of the overlay network is breached for the packet.

15. The non-transitory computer-readable storage medium of claim 14, wherein the forwarding rule prevents forwarding of a packet back to the overlay network that sent the packet.

16. The non-transitory computer-readable storage medium of claim 11, wherein the method further comprises receiving, from the upstream network device, a second message indicating a second set of ports of the upstream network device from which the MAC address is observed.

17. The non-transitory computer-readable storage medium of claim 11, wherein the method further comprises:
in response to determining that a network device has observed the MAC address, adding the network device to a list of probed network devices; and
probing a respective network device of the list of probed network devices.

18. The non-transitory computer-readable storage medium of claim 17, wherein the method further comprises terminating the probing of the respective network device of the list of probed network devices in response to determining that there is no further upstream network device associated with the MAC address present in the overlay network.

19. The non-transitory computer-readable storage medium of claim 11, wherein the method further comprises determining that the first set of ports of the first network device is not directed to a recipient.

20. A computer system, comprising:
a processor;
a non-transitory computer-readable storage medium storing instructions that when executed by the processor cause the computer system to:
operate a network management system (NMS) on the computer system;
determine that a loop associated with a media access control (MAC) address has been detected in an overlay network, wherein a respective network device in the overlay network is provisioned and managed by the NMS;
probe a first network device in the loop by instructing the first network device to observe the MAC address for a predetermined period;
receive, from the first network device, a first message indicating a first set of ports of the first network device from which the MAC address is observed, wherein observing the MAC address at a port includes receiving a plurality of packets with the MAC address via the port; and
probe an upstream network device reachable via each of the first set of ports by instructing the upstream network device to observe the MAC address for the predetermined period, wherein observing the MAC address at an upstream port of the upstream network device causes probing of a further upstream network device reachable via the upstream port; and determine, based on probing of a respective network device in the loop, one or more network devices that have erroneously forwarded a packet along the loop as loop origination points (LOPs) for the loop.

\* \* \* \* \*